United States Patent
McIntire

[11] 3,804,326
[45] Apr. 16, 1974

[54] THERMAL VACUUM VALVE
[75] Inventor: Elmer L. McIntire, Northville, Mich.
[73] Assignee: Chrysler Corporation, Highland Park, Mich.
[22] Filed: Dec. 27, 1972
[21] Appl. No.: 318,949

[52] U.S. Cl............... 236/92, 236/87, 236/101, 123/117 A, 137/468
[51] Int. Cl. ........................................ G05d 23/02
[58] Field of Search............... 137/468; 123/117 A; 236/87, 92, 93, 101

[56] References Cited
UNITED STATES PATENTS
3,506,194  4/1970  Resseguie ............................ 236/87
3,704,697  12/1972 Weymann ....................... 123/117 A
3,729,132  4/1973  Ludwig ............................... 236/101
3,734,403  5/1973  Eshelman............................. 236/87

Primary Examiner—Harold W. Weakley

[57] ABSTRACT

In a motor vehicle having a source of vacuum such as the manifold vacuum and a vacuum utilization means, a thermal vacuum switch is interconnected in the conduit between the source and the utilization means for controlling the flow of vacuum according to ambient temperature. The thermal vacuum valve is sealed against vauum leaks between the input and output ports of the valve by the cooperation of a resilient umbrella-shaped dump valve and smooth broadside bimetal disc. Additionally, the structural shape of the valve housing affords the means for thermal bonding of the housing and the cover for preventing vacuum leaks.

7 Claims, 6 Drawing Figures

PATENTED APR 16 1974 3,804,326

THERMAL VACUUM VALVE

BACKGROUND OF INVENTION

1. Field of Invention

This invention relates to vacuum valves in general and in particular to a thermal actuated vacuum valve.

2. Prior Art

Prior art devices such as relief valves utilize a bimetal disc for opening and closing a valve in response to a predetermined temperature level in a fluid. This type of valve is a safety device which operates only when the equipment to which it is connected is in danger of exceeding its temperature limits. An example of such a valve is illustrated in U.S. Pat. No. 2,613,874 showing a bimetal disc being held around its periphery by the valve casing. A threaded member carried by the bimetal disc carries a valve member which cooperates with a fixed valve seat to close the valve below a predetermined temperature.

U.S. Pat. No. 2,647,017 illustrates another bimetal valve being held around its periphery by the clamping action of the valve body and carrying a valve member for seating in a valve seat.

U.S. Pat. No. 2,698,022 illustrates a bimetal member for use in a liquid soap dispenser such as found in an automatic dishwasher. When the temperature of the water reaches a predetermined level, the member flexes and allows the soap to enter the machine. The member is supported on a pivot attached to a cantilever beam and operates to seal the dispenser around its periphery.

U.S. Pat. No. 2,777,303 illustrates a fixed bimetal member which is attached to a rod and operates to seal or open a sump drain valve. The bimetal member is fixedly located in relation to the valve port.

U.S. Pat. No. 2,883,112 illustrates a cantileverly supported flat bimetal member that functions to control an air passage in an internal combustion engine. At the free end of the bimetal member there is affixed a valve element that cooperates with a valve seat to control the intake of air into the combustion system.

U.S. Pat. No. 3,595,262 teaches a thermal responsive switch utilizing a bimetal member to conduct the flow of fluid between an input port and either one of two output ports. This bimetal is freely supported within the valve body and is used for not only sealing either of two valve seats but also to direct the fluid away from the seat which it is sealing.

SUMMARY OF INVENTION

There is disclosed and claimed herein a thermal vacuum valve having a cylindrical tubular housing member which is enclosed at one end defining a chamber. The enclosed end has a centrally located port with an integral nipple extension for permitting fluid communication between the chamber and a conduit connected to the extension. A mating cover member cooperates with the housing member to enclose and seal the chamber. The cover member additionally contains a centrally located port with an integral nipple extension for permitting fluid communication between the chamber and a second conduit connected thereto. A resilient deformable dump valve means is inserted in the port of the housing member and contains an axially aligned aperture therethrough. A plurality of supporting members are spaced around the periphery of the bottom of the chamber and extend toward the cover. Located on and supported by the supporting members is a thin thermal responsive member or bimetal which is normally bowed in one direction at a first temperature for cooperating with the dump valve to seal the aperture against fluid flow. The bimetal is responsive at a second temperature to snap to a second bowed direction away from the aperture for allowing fluid communication. The second bowed direction is opposite the first direction. A resilient biasing member holds the bimetal against the supporting means.

DETAILED DESCRIPTION

Figure 1:
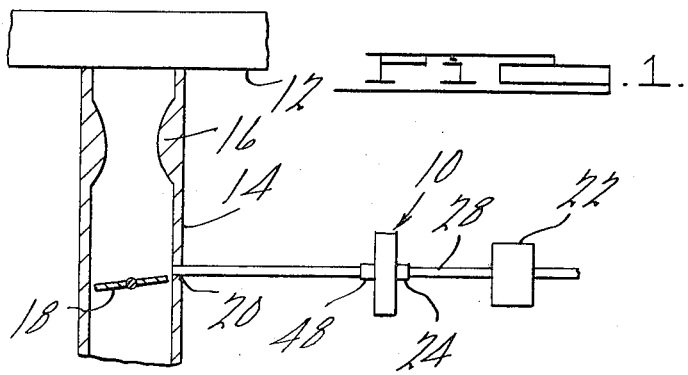
FIG. 1 is a schematic of carburetor system incorporating the thermal vacuum valve.

Referring to the figures by the characters of reference, there is illustrated in schematic form in FIG. 1, a carburetor-vacuum system utilizing a thermal vacuum valve 10. In the system there is illustrated an air cleaner 12, an air intake conduit 14 of a carburetor, a venturi section 16 of the intake conduit, a throttle valve 18, a vacuum output port 20, the thermal vacuum valve 10 and a vacuum utilization device 22.

In the operation of the system of FIG. 1, air is drawn from the environment through the air cleaner 12 down the air intake conduit 14 to the cylinders of the internal combustion engine. The movement of air flow is as a result of the throttle valve 18 being opened and thereby connecting the manifold vacuum which is present downstream of the throttle valve to the atmospheric pressure at the air cleaner 12. Adjacent to and upstream of the normal position of the throttle valve is an output port 20 from the carburetor for bleeding off or removing a vacuum level for utilization elsewhere in the engine. This port 20 is typically identified as the ported spark vacuum port and it has a vacuum range from atmospheric pressure at and below idle speed to several inches of mercury at an intermediate speed with the throttle valve 18 partially open and then back to approximately atmospheric pressure at wide open throttle (WOT).

The utilization means 22 as illustrated in FIG. 1 may be an exhaust gas re-circulation valve, EGR valve, which operates to mix exhaust gas with the fluid mixture in the intake manifold for re-burning in the cylinder. By this means, the oxides of nitrogen, NOX, are reduced in the exhaust gas. This is a result of the cylinder temperature being reduced because of the presence of the mixture including the hot unburned exhaust gases. The typical EGR valve is operated by the vacuum derived from the carburetor actuating the valve member in the EGR valve to interconnect the input to the output of the EGR valve. As the vacuum is increased, the valve opening is increased allowing more exhaust gas re-circulation.

Interconnected in the vacuum line from the carburetor to the EGR valve 22 is the thermal vacuum valve 10 for controlling the application of vacuum to the EGR valve as a function of temperature. At cold temperatures, the application of exhaust gases in the cylinder mixture results in poor engine performance while at warm temperatures the performance is acceptable. As will hereinafter be shown, the thermal vacuum valve 10 is a small, lightweight valve that is interconnected in the vacuum line and is responsive to the engine temperatures. With engine temperature below a first temperature range, which in the preferred embodiment has an upper level of 45°F., the valve 10 is closed and at a second temperature range above 60°F., the valve is open allowing the ported spark vacuum to be applied to the utilization means 22.

Figure 2:
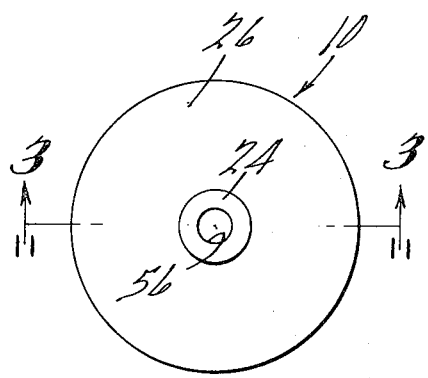
FIG. 2 is a top view of the thermal vacuum valve.

Referring to FIG. 2, there is illustrated a plan view of the thermal vacuum valve 10 showing the output nipple extension 24 from the cover member 26. The conduit 28 between the utilization means 22 and the valve 10 is placed on the nipple extension 24 providing an airtight connection.

Figure 3:
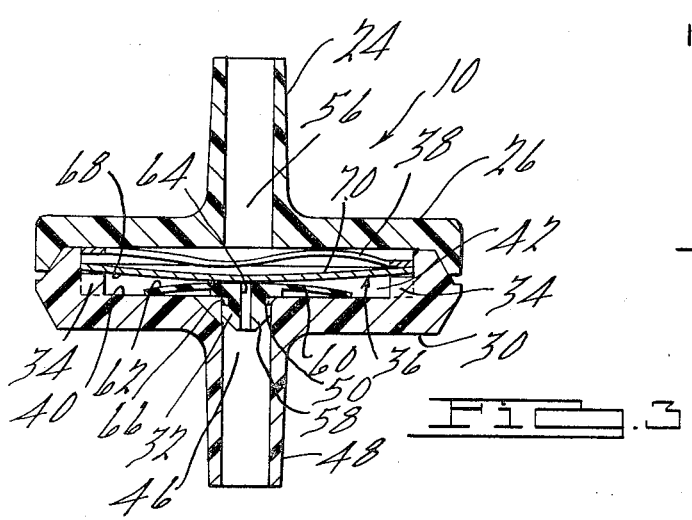
FIG. 3 is a sectional view taken along line 3—3 of FIG. 2.

A section line 3—3 is drawn through the axis of the valve 10 for illustrating the interior structure of valve in FIG. 3. This illustrates the symmetrical relationship of the several elements of the valve 10 and their cooperation with each other. It is important to note that the structure of valve is free of any surface coatings and O-rings which are typical in valves of this character for sealing.

Figure 4:
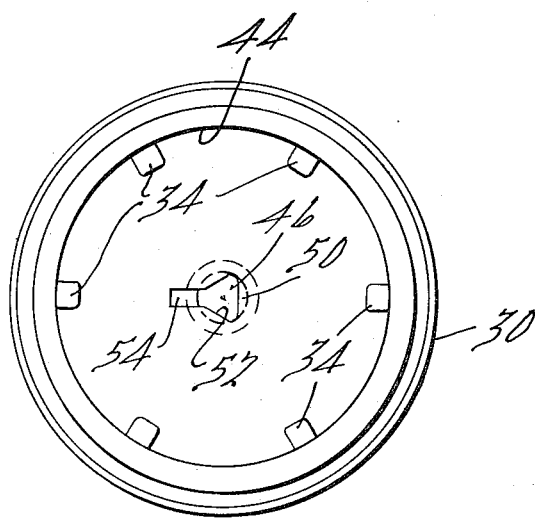
FIG. 4 is a plan view of the cylindrical tubular housing member of the thermal vacuum valve.

Referring to FIG. 3 and FIG. 4, there is illustrated in sectional form the cylindrical tubular housing member 30, the cover member 26, the dump valve 32, the supporting members 34, the thermal responsive member or bimetal 36 and the resilient biasing means 38.

The cylindrical tubular housing member 30 is enclosed at one end 40 and thereby defines a chamber 42 between the open end and the side walls 44 thereof. At the closed end 40 and along the axis of the member 30, there is an input port 46 having an integral nipple extension 48 for fluid communication between the chamber 42 and the source of vacuum 20 as illustrated in FIG. 1. The housing member 30 cooperates with the cover member 26 to enclose and seal the chamber 42 against vacuum leaks. In the preferred embodiment, both the cover member 26 and the housing member 30 are fabricated from a glass filled polyester material and their peripheries are sealed by means of thermal sealing or bonding.

The input port 46 in the housing member 30 is cylindrical in shape having a lip portion 50 flush with the enclosed surface 40 of the chamber 42. The lip portion 50 extends into the open portion of the port 46 and has a peripheral edge 52 that defines a polygon shape. In the preferred embodiment as illustrated in FIG. 4, the shape of the edge 52 is that of a triangle with a modification at one apex of the triangle as will hereinafter be described. The lip 50 has an axial thickness that is small compared to the axial length of the port 46 and nipple extension 48 combination.

The modification of the lip 50 which is an inclined slot 54 extending from the enclosed surface 40 of the chamber 42 and into the port 46. This slot 54 functions as a vacuum bleed means which reduces and eliminates any residual vacuum at the output port 56 of valve when the input to the valve is at a higher pressure. This slot 54 functions, regardless of the temperature but is necessary at temperatures in the first temperature range.

Figure 5:
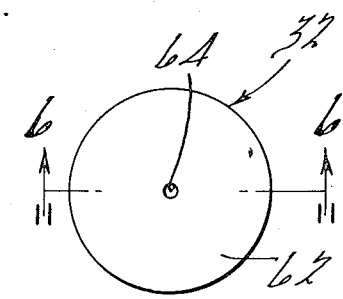
FIG. 5 is a plan view of the dump valve.
Figure 6:
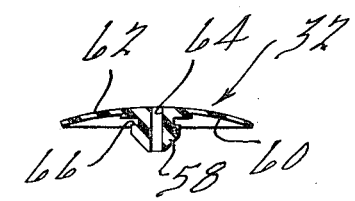
FIG. 6 is a sectional view taken along line 6—6 of FIG. 5.

Positioned within the input port 46 of the housing member 30 is a resilient, flexible, umbrella-shaped dump valve 32 which is illustrated in FIGS. 5 and 6. The umbrella valve 32 has an axially located stem portion 58 extending from the concave side 60 of the umbrella-shaped portion 62. The cross-sectional area of the umbrella shape 62 is sufficient to overlie and extend beyond the vacuum bleed slot 54. An aperture 64 extends axially along the stem 58 from the upper surface 62 of the umbrella as shown in FIGS. 3 and 6 to the lower end of the stem 58. This aperture 64 provides the passage for the fluid flow from the input port 46 to the output port 56 of the valve 10 and is opened or closed by means of the bimetal 36. The stem portion 58 of the dump valve 32 has a peripheral groove 66 therein which is positioned within the confines of the height of the concave portion 60 of the umbrella 62. The axial length of the groove 66 is equal to the axial thickness of the lip 50 of the housing 30. It is the cooperation of the flexibility and resiliencey of the dump valve 32 cooperating with the polygon-shaped lip 50 in the housing 30 that positions and secures the dump valve within the housing. The polygon shape allows the stem 58 to resiliently compress and deform for passage therethrough until sides of the groove 66 encompass the lip 50. When this happens, the stem 58 returns to its original cylindrical shape and secures the dump valve 32 in the input port 46.

When the pressure at the input port 46 is greater than the pressure at the output port 56, the vacuum bleed slot 54 allows flow to leave the umbrella edges thereby breaking the seal between the dump valve 32 and the housing enclosed surface 40. This action reduces the vacuum residual effects at the utilization means 22 at temperatures in the first temperature range.

Spaced around the periphery, of the chamber 42 and extending from the enclosed surface 40 are a plurality of supporting members 34. These members 34 are individual and are spaced for fluid flow therebetween thereby allowing fluid to flow between the input 46 and output 56 ports through the bleed slot 54 in the first temperature range. The height of the supporting members above the enclosed surface 40 is greater than the height of the concave portion 60 of the umbrella 62 for supporting the bimetal 36 above the dump valve 32.

The thermal-responsive, thin member or bimetal 36 overlies the dump valve 32 and is supported by the supporting members 34. The bimetal member 36 like the chamber 42 has a circular cross-section in the preferred embodiment but the cross-sectional area of the bimetal 36 is less than the cross-sectional area of the chamber 42. This difference allows fluid flow between the input 46 and output 56 ports through the bleed valve 54.

The bimetal 36 is normally in a first bowed direction in the first temperature range below 45°F. In this first direction, the central surface area of the broadside 68 of the bimetal 36 is in sealed contact with the crown portion including the aperture 64 of the umbrella valve 32. The height of the bow of the bimetal 36 and the height of the supporting means 34 causes the bimetal to resiliently compress the crown of the dump valve 32 thereby effectively forming a vacuum-tight seal. No other substance is required to form the seal.

When the temperature range of the environment of the valve 10 exceeds the first temperature range, below 45°F. and comes into a second temperature range above 60°F., the bimetal 36 snaps from the one bowed direction to a second bowed direction. In this direction, the bow of the bimetal 36 is opposite the first bowed direction and in fact the height of the bow extends away from the height of the supporting means 34. In this second bowed direction, the aperture 64 is open for fluid flow between the input port 46 and the output port 56 around the periphery of the bimetal 36 and between the several support members 34. The differential between the first and second temperature range is a working range during which the bimetal 36 will snap from one bowed direction to a second bowed direction and will be stable in a bowed direction in either of the two temperature ranges.

The bimetal 36 is held around its periphery by a circular formed resilient biasing member or spring 38. The spring 38 bears against the inside of the cover member 26 and against a peripheral rim section of the bimetal 36. In this manner, the spring 38 locates and holds the bimetal 36 against the supporting members 34 but does not interfere with the thermal response of the bimetal.

The bimetal member 36 as previously indicated is a thin circular member having a pair of spaced parallel broadsides 68 and 70. The one broadside 68 adjacent the dump valve 32 is of a uniform surface that it will effectively seal the aperture 64 in the dump valve 32 without accurately locating and holding the bimetal 36 in the chamber 42. This structure allows the bimetal 36 to be merely placed within the chamber 42 and allowed to seek its own position on the supporting members 34. The spring member 38 has a periphery which more closely approximates the cross-sectional periphery of the chamber 42 so that the spring 38 will bear on the outer rim section of the bimetal 36 and not interfere with the thermal snapping of the bimetal.

The valve seat as previously indicated is the crown of the resilient umbrella valve 32 and the closure member is the smooth broadside surface 68 of the bimetal 36.

In operation of thermal vacuum valve 10 when the temperature is in the first range and the bimetal 36 is in sealing contact with the umbrella valve 32, the leakage flow rate to the output port 56 is less than 5cc/minute with a vacuum of 20 inches of mercury on the input port 46. If the vacuum at the output port 56 is 0.5 inches of mercury greater than the vacuum at the input port 46, the bleed valve 54 will operate to equalize the vacuum levels within this 0.5 inches vacuum level differential.

There has thus been illustrated and described a thermal vacuum valve 10 having a housing member 30 with a tubular chamber 42 enclosed at one end. An axially located port 46 extends from the enclosed end 40 of the chamber 42 through a nipple extension 48 to outside of the valve. A cover member 26 also having an axially-located port 56 with a nipple extension 24 mates with the open end of the chamber 42 and cooperates therewith to seal the chamber 42 from the pressures outside of the valve. An umbrella dump valve 32 is compressively positioned in the input port 46 of the housing 30 and cooperates with a bimetal member 36 to control the flow of fluid between the two axial ports. Other aspects of the valve 10 are the polygon shaped lip 50 holding the dump valve 32 in the housing 30, a vacuum bleed valve 54 for reducing and eliminating the vacuum hysteresis of the utilization means 22 and a resilient biasing means 38 cooperating with the supporting members 34 to locate and hold the bimetal 36 in the chamber 42 without the need of grooves along the chamber walls 44. The cover 26 and the housing 30 are sealed together by thermal bonding to effect a vacuum-tight seal to the valve 10.

What is claimed is:

1. A thermal vacuum valve comprising:
   a cylindrical tubular housing member enclosed at one end thereof defining a chamber, said member having a centrally located port with an integral nipple extension in said one end for fluid communication between said chamber and the outside of said housing member;
   a cover member cooperating with the other end of said cylindrical housing member for enclosing said chamber, said cover having a centrally located port with an integral nipple extension therein for fluid communication between said chamber and the outside of said cover member;
   dump valve means compressively inserted in said port of said housing member and extending beyond the periphery of said port within said chamber, said valve means having an aperture therethrough extending in a direction axially aligned with said port of said housing member;
   a plurality of supporting members spaced around the periphery of said chamber and extending toward the other end thereof;
   a thermal-responsive, thin member normally bowed in a first direction, said member supported by said supporting members overlying the aperture in said dump valve means, said thermal responsive member responsive to a first temperature range for being in sealed contact with the aperture in said valve means in said normally bowed first direction and responsive to a second temperature range for snapping to a second bowed direction away from said aperture in said valve means allowing fluid communication across said chamber between said aperture in said valve means and said port in said cover member; and
   resilient biasing means located in said chamber and bearing on the peripheral surface of said thermal member and said cover member for locating and holding said thermal member against said supporting members.

2. The thermal vacuum valve according to claim 1 further including vacuum bleed means in the chamber of said housing for allowing fluid communication between the ports of said housing member and said cover member when the pressure at the port of said housing member is greater than the pressure at the port of said cover member.

3. The thermal vacuum valve according to claim 1 wherein said first temperature range is less than 45°F.

4. The thermal vacuum valve according to claim 1 wherein said second temperature range is greater than 60°F.

5. The thermal vacuum valve according to claim 1 wherein said port in said housing member is circular in shape having an inscribed polygon shaped lip flush with the one end of said chamber, said lip extending axially along said port to a point intermediate the said one end and the end of said nipple extension.

6. The thermal vacuum valve according to claim 5 wherein said dump valve means is a resilient, flexible umbrella-shaped member having a stem extending along the axis of said umbrella-shaped portion, said stem having peripheral groove therein for receiving said lip thereby retaining said valve means in said body.

7. The thermal vacuum valve according to claim 6 wherein said polygon shaped lip defines a triangular-shaped opening for compressively receiving said stem of said dump valve.

* * * * *